United States Patent
Kunapuli et al.

(10) Patent No.: US 9,811,844 B2
(45) Date of Patent: Nov. 7, 2017

(54) SYSTEMS AND METHODS FOR DETERMINING DIGITAL DEGREES OF SEPARATION FOR DIGITAL PROGRAM IMPLEMENTATION

(71) Applicants: Sreenivas Kunapuli, Hyderabad (IN); Ritesh Kumar Jain, Bangalore (IN)

(72) Inventors: Sreenivas Kunapuli, Hyderabad (IN); Ritesh Kumar Jain, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 203 days.

(21) Appl. No.: 14/619,005

(22) Filed: Feb. 10, 2015

(65) Prior Publication Data

US 2016/0099925 A1   Apr. 7, 2016

(30) Foreign Application Priority Data

Oct. 7, 2014 (IN) .......................... 4988/CHE/2014

(51) Int. Cl.
| | | |
|---|---|---|
| *G06Q 30/02* | (2012.01) | |
| *H04L 29/06* | (2006.01) | |
| *H04L 29/08* | (2006.01) | |
| *G06F 21/33* | (2013.01) | |
| *G06F 21/62* | (2013.01) | |

(52) U.S. Cl.
CPC ......... *G06Q 30/0282* (2013.01); *G06F 21/33* (2013.01); *G06F 21/6227* (2013.01); *G06Q 30/0201* (2013.01); *H04L 63/104* (2013.01); *H04L 67/306* (2013.01)

(58) Field of Classification Search
CPC .............. G06Q 30/02; G06Q 30/0201; G06Q 30/0282; H04L 63/08; H04L 67/306
See application file for complete search history.

(56) References Cited

U.S. PATENT DOCUMENTS

| | | | | |
|---|---|---|---|---|
| 2011/0030764 | A1* | 2/2011 | Seo ........................ | H01L 31/048 136/246 |
| 2011/0307354 | A1* | 12/2011 | Erman ..................... | G06F 8/60 705/27.1 |

(Continued)

*Primary Examiner* — Robert Leung
(74) *Attorney, Agent, or Firm* — Finnegan, Henderson, Farabow, Garrett & Dunner LLP

(57) ABSTRACT

This disclosure relates generally to enterprise software management, and more particularly to systems and methods for determining digital degrees of separation for digital program implementation. In one embodiment, a digital degrees of separation determination system is disclosed, comprising a hardware processor, and a memory storing instructions executable by the processor for obtaining user credentials, and determining a user classification based on the user credentials. The processor may execute the instructions for identifying a user digital need based on the user classification, and querying a database for market-available software applications related to the user digital need. Further, the processor may execute the instructions for obtaining a list of user-accessible software applications related to the user digital need, and comparing characteristics of the market-available software applications to the user-accessible software applications. Also, the processor may execute the instructions for calculating a digital degrees of separation based on the comparison.

26 Claims, 13 Drawing Sheets

(56) References Cited

U.S. PATENT DOCUMENTS

| | | | |
|---|---|---|---|
| 2011/0320307 A1* | 12/2011 | Mehta | G06Q 30/0282 |
| | | | 705/26.7 |
| 2013/0061174 A1* | 3/2013 | Buchanan | G06Q 30/0601 |
| | | | 715/810 |
| 2013/0085886 A1* | 4/2013 | Satish | G06Q 30/02 |
| | | | 705/26.7 |
| 2014/0344254 A1* | 11/2014 | Pu | G06Q 30/0282 |
| | | | 707/722 |

* cited by examiner

SYSTEMS AND METHODS FOR DETERMINING DIGITAL DEGREES OF SEPARATION FOR DIGITAL PROGRAM IMPLEMENTATION

PRIORITY CLAIM

This U.S. patent application claims priority under 35 U.S.C. §119 to: India Application No. 4988/CHE/2014, filed Oct. 7, 2014. The aforementioned application is incorporated herein by reference in its entirety.

TECHNICAL FIELD

This disclosure relates generally to enterprise software management, and more particularly to systems and methods for determining digital degrees of separation for digital program implementation.

BACKGROUND

Organizations are increasing efforts to deploy productivity software applications to their employees, customers, investors, etc. as part of their "digital" strategy. However, organizations typically do not have objective measures of what software applications individual users or groups of users have access to, what software applications are available in various marketplaces, and whether the users or user groups would benefit from utilizing the applications available in the marketplace over their existing accessible applications. Organizations embarking on digital program implementation without answering the above questions may end up providing the users and user groups disparate applications without a comprehensive digital strategy.

Some of the questions that organizations face difficulty answering while implementing their digital strategy are: (1) Who should and shouldn't be considered as the user for a software application; (2) How much automation or software is required in each user role; (3) When is such automation or software required; and (4) Whether the change have an impact on the organization itself.

SUMMARY

In one embodiment, a digital degrees of separation determination system is disclosed, comprising a hardware processor, and a memory storing instructions executable by the processor for obtaining user credentials, and determining a user classification based on the user credentials. The processor may execute the instructions for identifying a user digital need based on the user classification, and querying a database for market-available software applications related to the user digital need. Further, the processor may execute the instructions for obtaining a list of user-accessible software applications related to the user digital need, and comparing characteristics of the market-available software applications to the user-accessible software applications. Also, the processor may execute the instructions for calculating a digital degrees of separation based on the comparison.

In one embodiment, a digital degrees of separation determination method is disclosed. The method may comprise obtaining user credentials, and determining a user classification based on the user credentials. The method may also comprise identifying a user digital need based on the user classification, and querying a database for market-available software applications related to the user digital need. The method may further involve obtaining a list of user-accessible software applications related to the user digital need, and comparing characteristics of the market-available software applications to the user-accessible software applications. The method may include calculating a digital degrees of separation based on the comparison.

In one embodiment, a non-transitory computer-readable medium is disclosed that stores computer-executable digital degrees of separation determination instructions to perform the methods disclosed herein.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
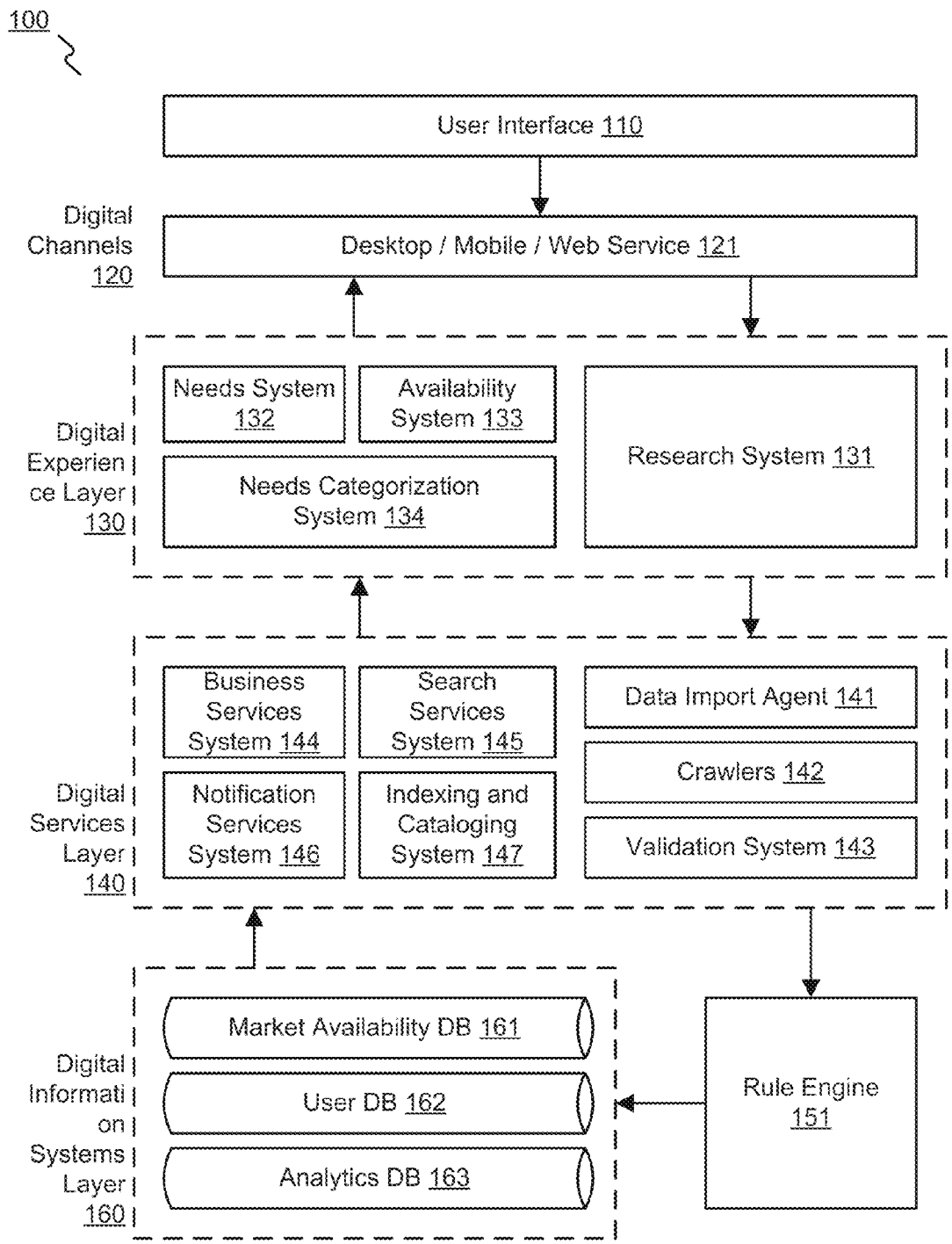
FIG. 1 illustrates an exemplary digital degrees of separation ("DDS") system 100 according to some embodiments of the present disclosure.

FIG. 1 illustrates an exemplary digital degrees of separation ("DDS") system 100 according to some embodiments of the present disclosure.

Embodiments of the present disclosure describe systems and methods for determining "digital degrees of separation" (or "DDS"). DDS may be considered as an objective measure of a difference or gap between the capabilities or utility of software accessible to a user or user group and the capabilities or utility of software available in marketplaces (e.g., over the Internet) designed to satisfy similar user needs as the user-accessible software. In some embodiments, the system may consider one or more of the following exemplary parameters to systematically measure DDS—

Type of user (customer, vendor, employee)
User software needs
User indications of desired software
Market availability of software applications
Criticality of software applications
Application access channel (web, voice, text)

In some embodiments, a digital degrees of separation ("DDS") system 100 may capture such parameters and determine a DDS value for an organization or user (e.g., a company, department, business unit, user group, individual user, etc.). DDS system 100 may comprise various systems to accomplish various aspects of measuring the DDS.

In some embodiments, DDS 100 may include a user interface 110. User interface 110 may facilitate users to access the DDS system 100 to determine a DDS value for themselves or their affiliated organization. In some embodiments, DDS system 100 may be implemented as a web application, which users may access using the user interface 110. User interface 110 may authenticate a user and authorized the user with an appropriate role. After successful authentication and authorization, the user may be given access to components of the DDS system 100. In some embodiments, a user may access the components of the DDS system via a user interface 110 operating via a digital channel layer 120, including, but not limited to: a desktop UI, web service UI, or via a mobile application 121.

In some embodiments, DDS system 100 may include one or more components provided within a digital experience layer 130. Digital experience layer 130 may be designed to interact with a user, and provide an interactive experience for the user. For example, digital experience layer 130 may include a research system 131. Research system 131 may provide structured data forms for users to complete to obtain data inputs from the users. In alternate embodiments, the research system 131 may provide an interactive application to collect structured or unstructured data from the users. In addition, in some embodiments, research system 131 may capture unstructured data in the form of RSS feeds from across the Internet. In conjunction with the data import agent 141 of a digital services layer 140, research system 131 may convert unstructured data into structured data sets suitable for automated computerized analysis. The digital service layer 140 may include components that provide services to other components within the DDS system 100, e.g., data import, data validation, and user interfaces for authorized users to view various aspects of the DDS system 100.

In some embodiments, DDS system 100 may include crawlers 142. In some embodiments, a crawler 142 may be a computer program that navigates the Internet, including web pages and web sites, captures unstructured data (e.g., in the form of HTML data), and provides the unstructured data as an output to other components of DDS system 100. In some embodiments, all data captured through crawlers, from user interactions (e.g., with data input forms or interactive applications, etc.), or from RSS feeds from across the Internet may be processed through a data import agent 141 to convert unstructured data into structured data and/or reformat structured data into a suitable format for importation and storage within DDS system 100. In some embodiments, a validation system 143 may determine whether data imported by the data import agent 141 has sufficient integrity to be used in subsequent DDS determinations.

In some embodiments, DDS system 100 may include a rule engine 151. Rule engine 151 may provide processing of preconfigured business rules in the DDS system 100, and may apply such rules against aggregated data. The rule engine 151 may handle multiple types of rules here. Some of the rules are mentioned below:

Mapping Rules, mapping digital data to users,
Merging Rules, merging digital needs of mapped users
Validation Rules, that validate the relevancy of data
Business Rules, that execute on data provided to map digital needs In some embodiments, data storage components may be provided within a digital information systems layer 160. For example, such a layer may include databases such as, but not limited to: market availability database 161, user database 162, and analytics database 163. Data outputs from the rule engine 151 may be stored in these databases. Market availability database 161 may store information on availability of software applications in a marketplace. Market availability may be gathered based on trends and analysis available in the industry.

In some embodiments, rule engine 151 may provide preconfigured business rules that execute upon data provided and apply the rules against this data to check for patterns of users' digital needs, the kind of issues these digital needs are being used for, numbers of users having the same digital need, etc. Such data that is used for analysis on the usage of a digital need may be stored in analytics database 163. User Database 162 may store information related to users, the applications installed on their user devices, the users' digital needs, etc.

In some embodiments, DDS system 100 may include one or more components provided within a digital service layer 140. Digital services layer 140 may be designed to provide various digital data processing services, including data manipulation and user interfaces. For example, digital service layer 140 may include a business services system 144 that facilitate system administration tasks, support services tasks, content service, etc. These services may also provide access to an individual, role, or group so that users have appropriate access to resources of DDS system 100. As another example, digital service layer 140 may include an index and cataloging system 147 that creates search indexes of multiple data sources, including structured as well as unstructured content, and maintains catalogs of information on various topics for users to consume. As another example, digital service layer 140 may include a search services system 145, which can be used for searching for, filtering through, and retrieving any data stored within DDS system 100.

As another example, digital service layer 140 may include notification services system 146, which may notify end users of any events related to DDS system 100. These could include change notifications, approval notifications, audit notifications etc. The notification services system 146 may also assist in notifying users when new services are published. Such notification services may facilitate smart application management on user devices, so that users do not require complicated tools or specific technical knowledge to install and maintain their needed applications.

In some embodiments, DDS system 100 may include one or more components provided within a digital experience layer 130. Digital experience layer 130 may be designed to interact with a user, and provide an interactive experience for the user. For example, digital experience layer 130 may include a needs system 132, which may give provide an interactive application within which to assess their digital application needs, determine the criticality of their needs. Needs system 132 may be implemented as a web portal to execute multiple functions as related to the DDS system 100. As another example, digital experience layer 130 may include a needs categorization system 134, which may obtain user information (e.g., applications installed on the user's device, a list of web applications to which the user has authorized access, etc.) invoke needs system 132 to identify the users' digital application needs, and categorize the needs according to one or more classification systems. Such information may be utilized in analytics to provide recommendations to an organization on applications in which it should invest based on aggregate needs of its user members. As another example, digital experience layer 130 may include an availability system 133, which may provide an interactive application for users to explore market availability of applications relevant to their needs, and view information on the marketplace(s) for applications. Users may be able to view market research performed using user surveys collected by research system 131 and stored in the market availability database 161.

Figure 2A:
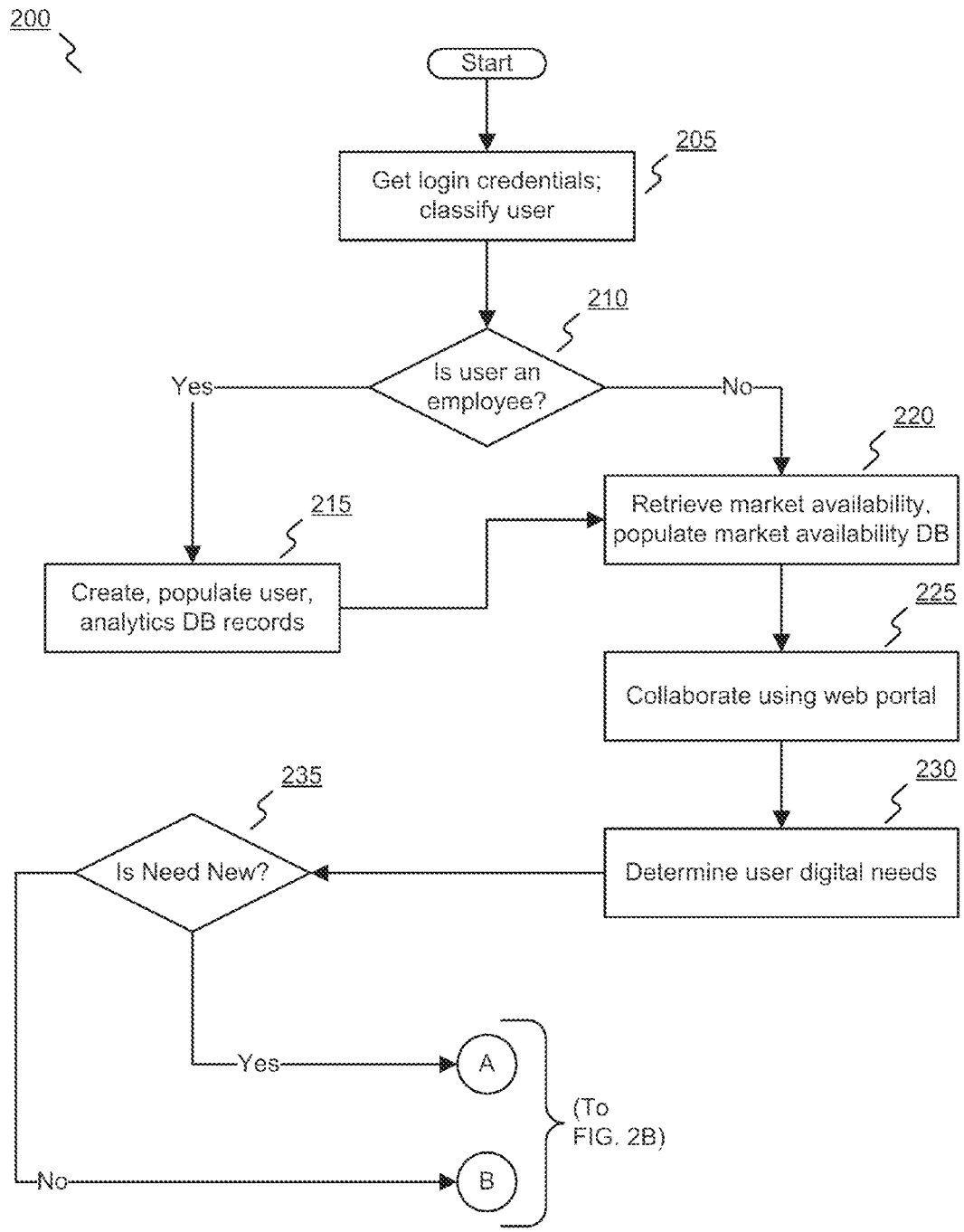
FIGS. 2A-B are flow diagrams illustrating an exemplary DDS determination method 200 in accordance with some embodiments of the present disclosure.
Figure 2B:
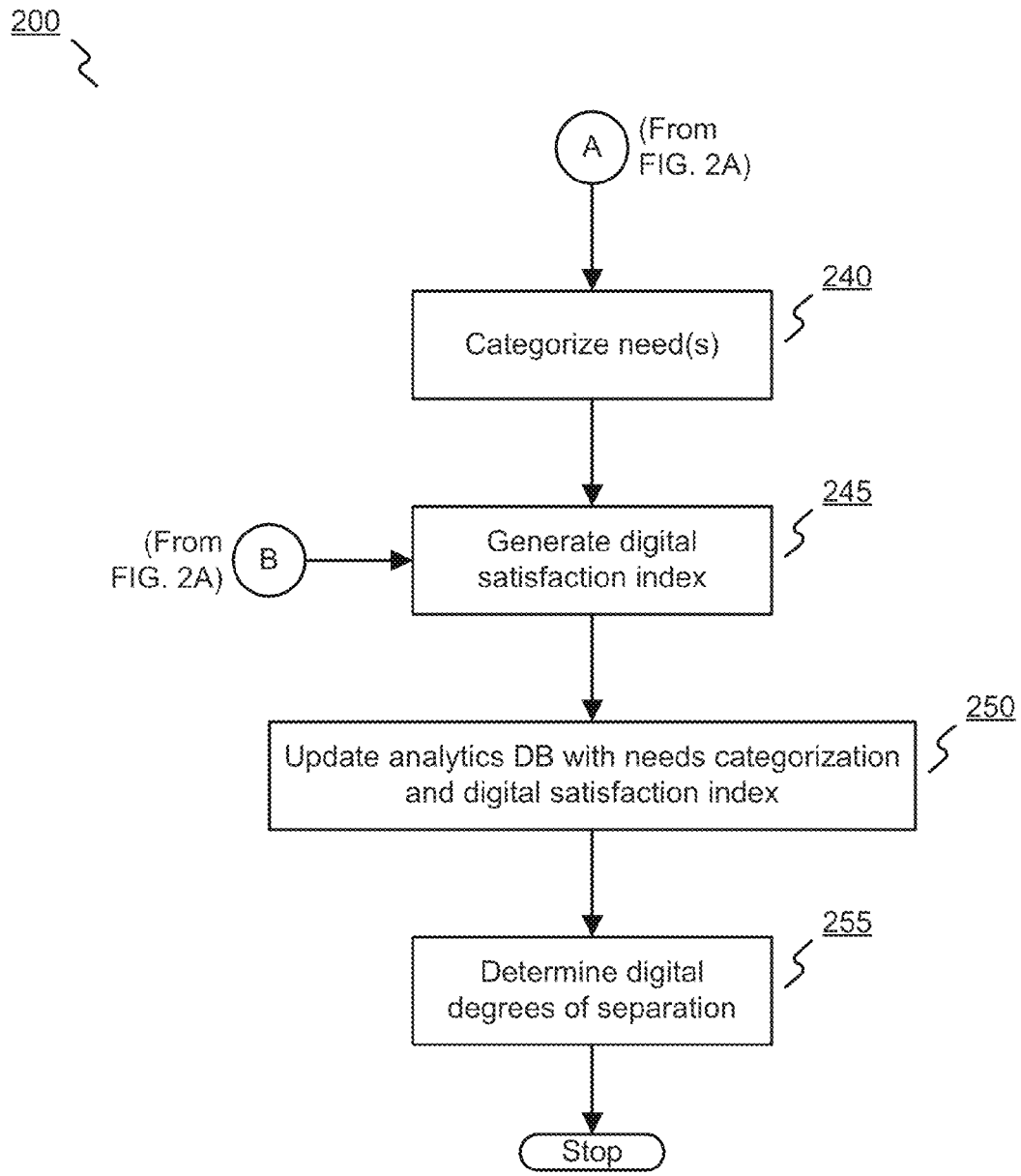

FIGS. 2A-B are flow diagrams illustrating an exemplary DDS determination method 200 in accordance with some embodiments of the present disclosure. With reference to FIG. 2A, at step 205, the DDS system 100 may obtain login credentials from a user, and classify the user based on the login credentials. For example, a user may supply user credentials to access the DDS system 100 using the user interface 110. After the user supplies the necessary user credentials, the DDS system 100 may authenticate the user for valid login credentials and authorize the user to see what role the user is assigned to within the DDS system 100. For this, the DDS system 100 may query user database 162. The DDS system 100 may classify the user based on the user credentials, e.g., as an employee, supplier, customer, investor, etc. Further, as an employee, the DDS system 100 may further classify the user as an employee with administrative rights, an small-to-medium enterprise (SME) sub-authorized employee, etc. In some embodiments, if the user is an employee, the user may be able to execute some special tasks not available to other users.

Figure 3:
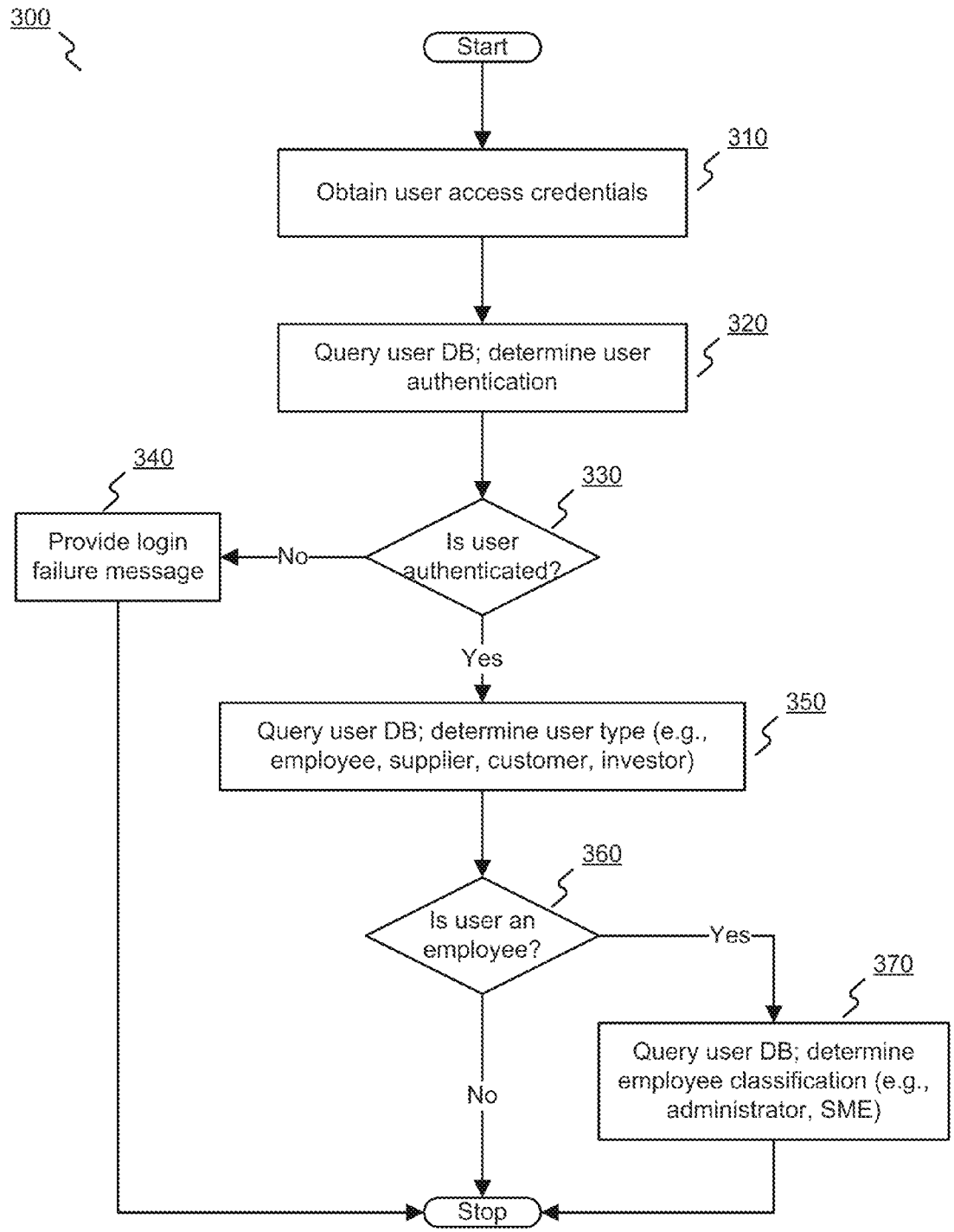
FIG. 3 is a flow diagram illustrating an exemplary user authentication and classification method 300 in accordance with some embodiments of the present disclosure.

FIG. 3 is a flow diagram illustrating an exemplary user authentication and classification method 300 in accordance with some embodiments of the present disclosure. In some embodiments, a user interface 110 of DDS system 100 may, at step 310, obtain user access credentials. These may be in the form of a user name and password, fingerprint, voice, or other biometric credential, a two-factor authentication text or voice input, etc. At step 320, DDS system 110 may query user database 162 using the received user access credentials, and determine whether the user is authenticated. For example, the DDS system 100 may use SQL commands to query user database 162 implemented as a relational database. At step 330, if the user is not authenticated, the DDS system 100 may, at step 340, provide the user a login failure message. Otherwise, if the user is authenticated at step 330, the DDS system 100 may, at step 350, query the user database 162 to determine a user type, e.g., employee, customer, supplier, investor, etc. Thus, the DDS system 100 may determine a classification of the user. In some embodiments, if the user is an employee (see step 360), the DDS system 100 may, at step 370, query user database 162 to determine an employee classification for the user (e.g., administrator, small-to-medium enterprise sub-authenticated user, etc.).

Returning to FIG. 2A, if the user is an employee (see step 210), at step 215, the DDS system 100 may create a database record and acquire user data from various sources. The DDS system 100 may, e.g., provide forms for users to fill, or provide interactive applications to collect data from the user. The DDS system 100 may also interrogate the user's device to obtain information about applications stored on the user device. All data captured may be processed by data import agent 141, parsed for structure, and validated for appropriateness by the validation system 143. The DDS system 100 may store such data in user database 162 and/or analytics database 163. At step 220, the DDS system 100 may fetch data from marketplaces, instantiate crawlers to scrape data from the Internet, or collect structured or unstructured data from various sources. All data captured may be processed by data import agent 141, parsed for structure, and validated for appropriateness by the validation system 143. The DDS system 100 may store such data in market availability database 161.

Figure 4:
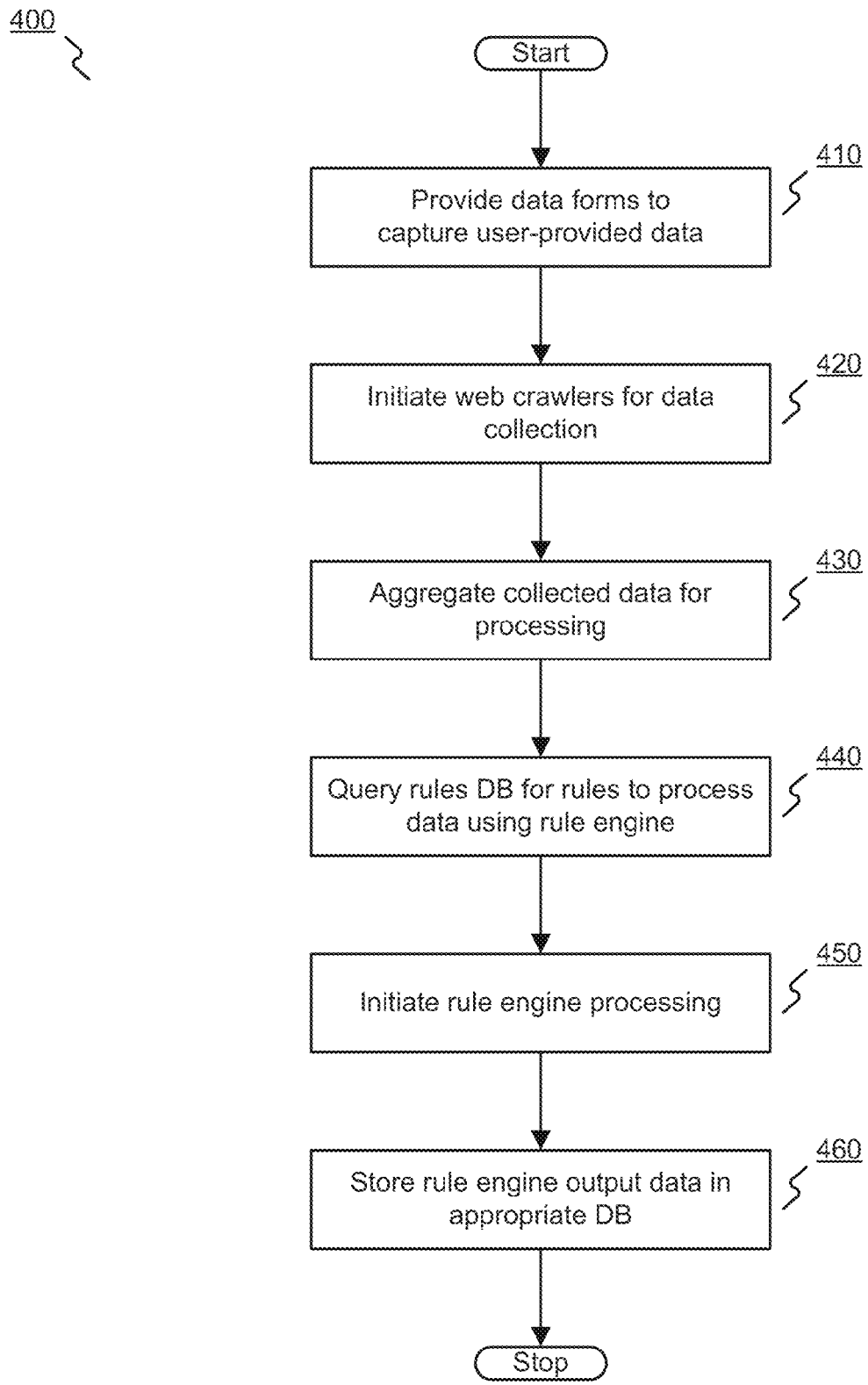
FIG. 4 is a flow diagram illustrating an exemplary database population method 400 in accordance with some embodiments of the present disclosure.

FIG. 4 is a flow diagram illustrating an exemplary database population method 400 in accordance with some embodiments of the present disclosure. In some embodiments, at step 410, DDS system 100 may utilize research system 131 to provide data forms (or an interactive web application) to the authenticated user to capture user-provided data. Such forms may be implemented as HTML input forms, or more sophisticated programming languages such as Visual Basic or Visual C++. Interactive applications may be implemented using such languages as Adobe® Flash, JavaScript, AJAX, etc. At step 420, DDS system 100 may initiate web crawlers, e.g., using the crawlers 142 system of FIG. 1. Such crawlers may scrape data in structured or unstructured form off websites, blogs, online application stores (e.g., Google Play, Apple App Store, Amazon marketplaces), etc. At step 430, DDS system 100 may aggregate the collected data, and at step 440, query a rules database (not shown) for rules to process the data using rule engine 151. Upon receiving such rules from a rules database, rules engine 151 may initiate rule engine processing at step 450. Accordingly, rule engine 151 may produce output data, which, at step 460, may be stored in an appropriate database, such as user database 162, analytics database 163, or market availability database 161.

Figure 5A:
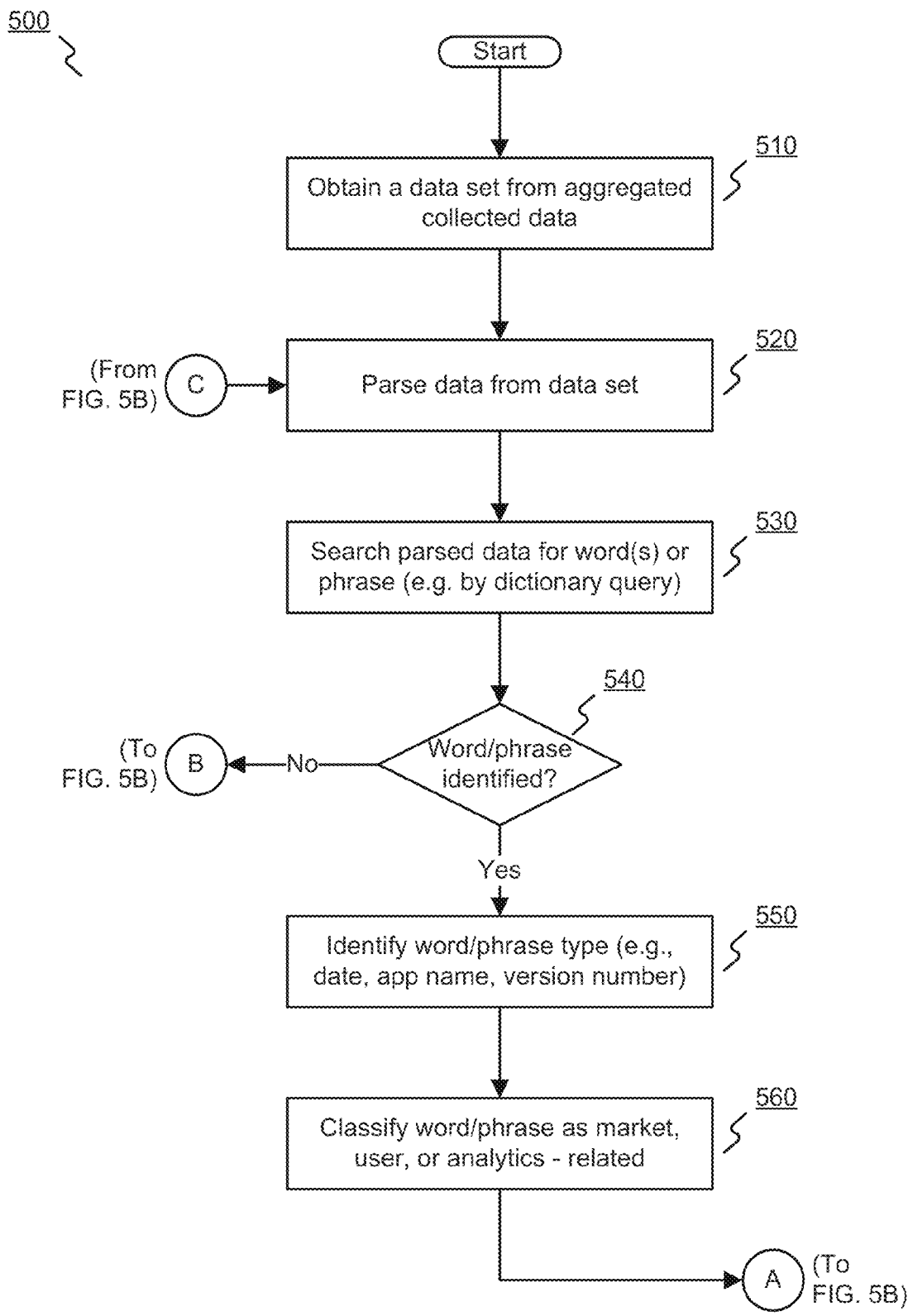
FIGS. 5A-B are flow diagrams illustrating an exemplary rule engine processing method 500 in accordance with some embodiments of the present disclosure.
Figure 5B:
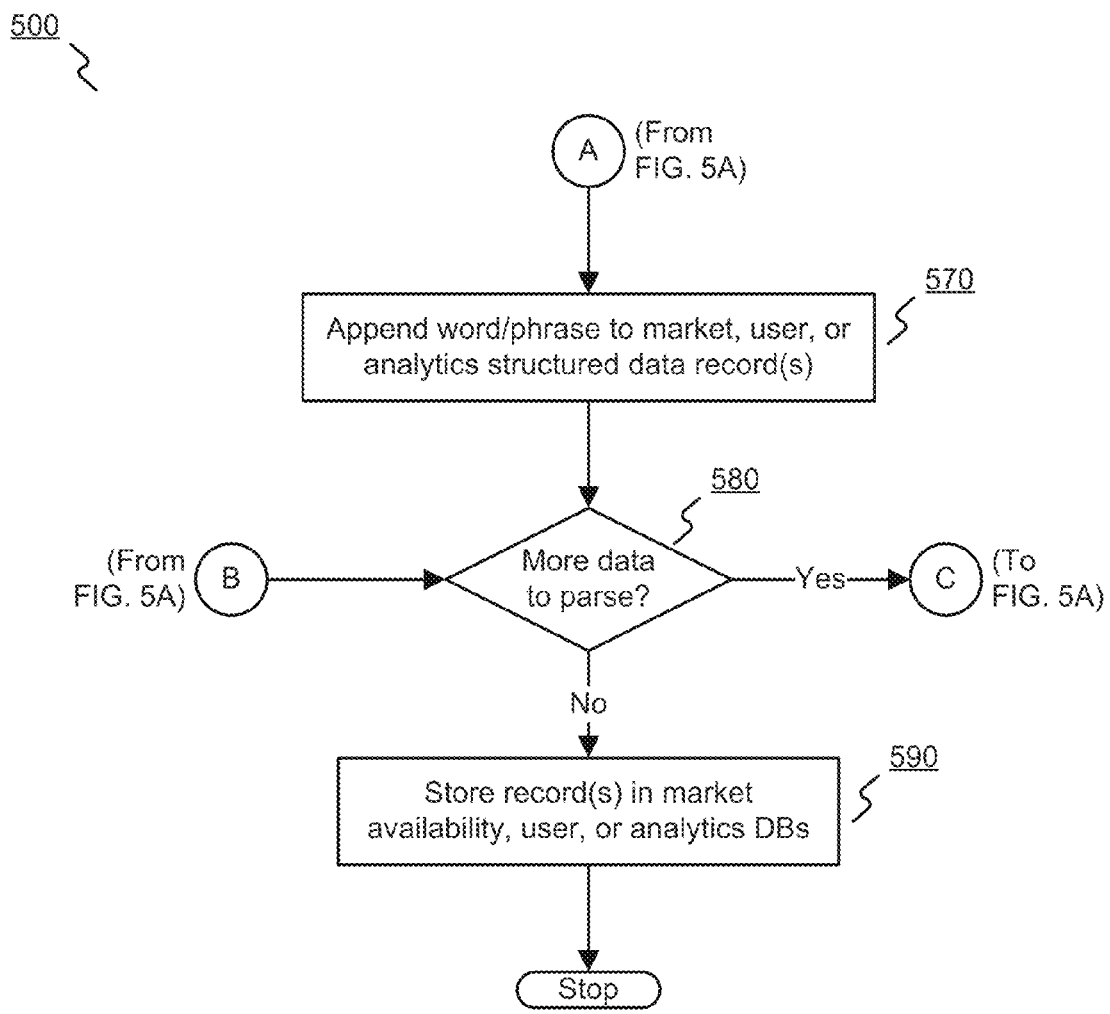

FIGS. 5A-B are flow diagrams illustrating an exemplary rule engine processing method 500 in accordance with some embodiments of the present disclosure. With reference to FIG. 5A, in some embodiments, rule engine 151 may process aggregated data according to rules from a rules database (not shown). At step 510, rules engine 151 may obtain a data set from the aggregated collected data obtained utilizing research system 131, crawlers 142, data import agent 141, and validation system 143. At step 520, rule engine 151 may parse the data set to extract individual data fields and values from the data set. At step 530, rule engine 151 may query a dictionary or other database (not shown) for words or phrases using the parsed data. For example, the rule engine may determine whether the parsed data exists within a dictionary. The rule engine 151 may utilize such a dictionary query to determine a type of the data, values for the data, or the like. For example, at step 540, if a word or phrase is identified, at step 550, the rule engine 151 may identify a word/phrase type (e.g., date, time, address, user ID, user name, application name, version number, etc.).

Using the word/phrase type, at step 560, the rule engine 151 may classify the word/phrase as market-, user-, and/or analytics-related.

With reference to FIG. 5B, at step 570, rule engine 151 may append the word/phrase to the market availability database 161, user database 162, and/or analytics database 163, depending on whether the rule engine 151 classified the word/phrase as market-, user-, and/or analytics-related. At step 580, the rule engine may determine whether there is any additional aggregated data left to parse, and if so, may return processing to step 520. Otherwise, at step 590, rule engine 151 may store the record(s) updated to the market availability database 161, user database 162, and/or analytics database 163.

Returning to FIG. 2A, at step 225, the DDS system 100 may provide various user interfaces for the user to view and interact with other users and with the aggregated data stored in user database 162, analytics database 163, and/or market database 161. At step 230, the DDS system 100 may determine the user's digital needs, for example, as discussed below with reference to FIGS. 6A-C.

Figure 6A:
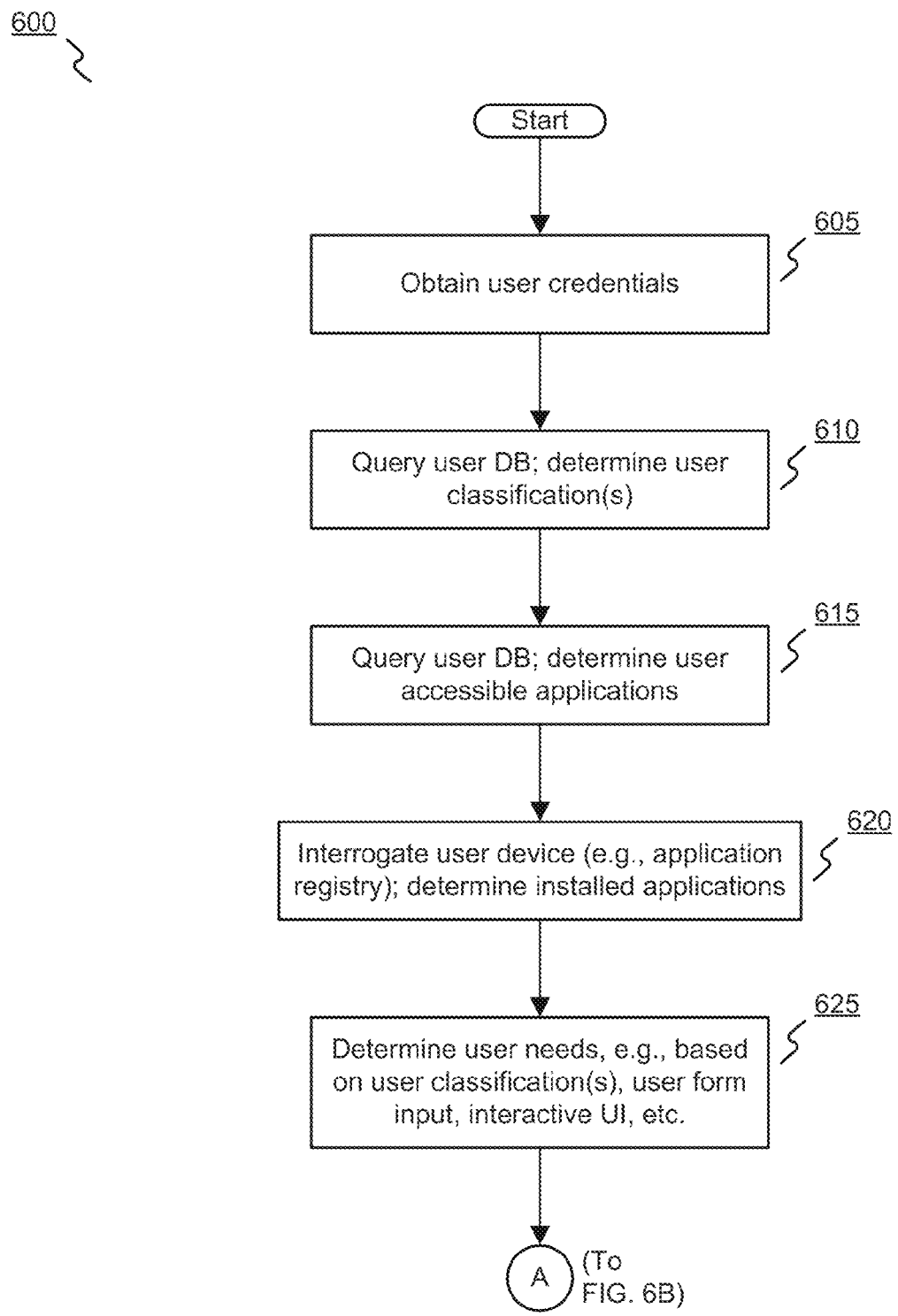
FIGS. 6A-C are flow diagrams illustrating an exemplary DDS determination method 600 in accordance with some embodiments of the present disclosure.
Figure 6B:
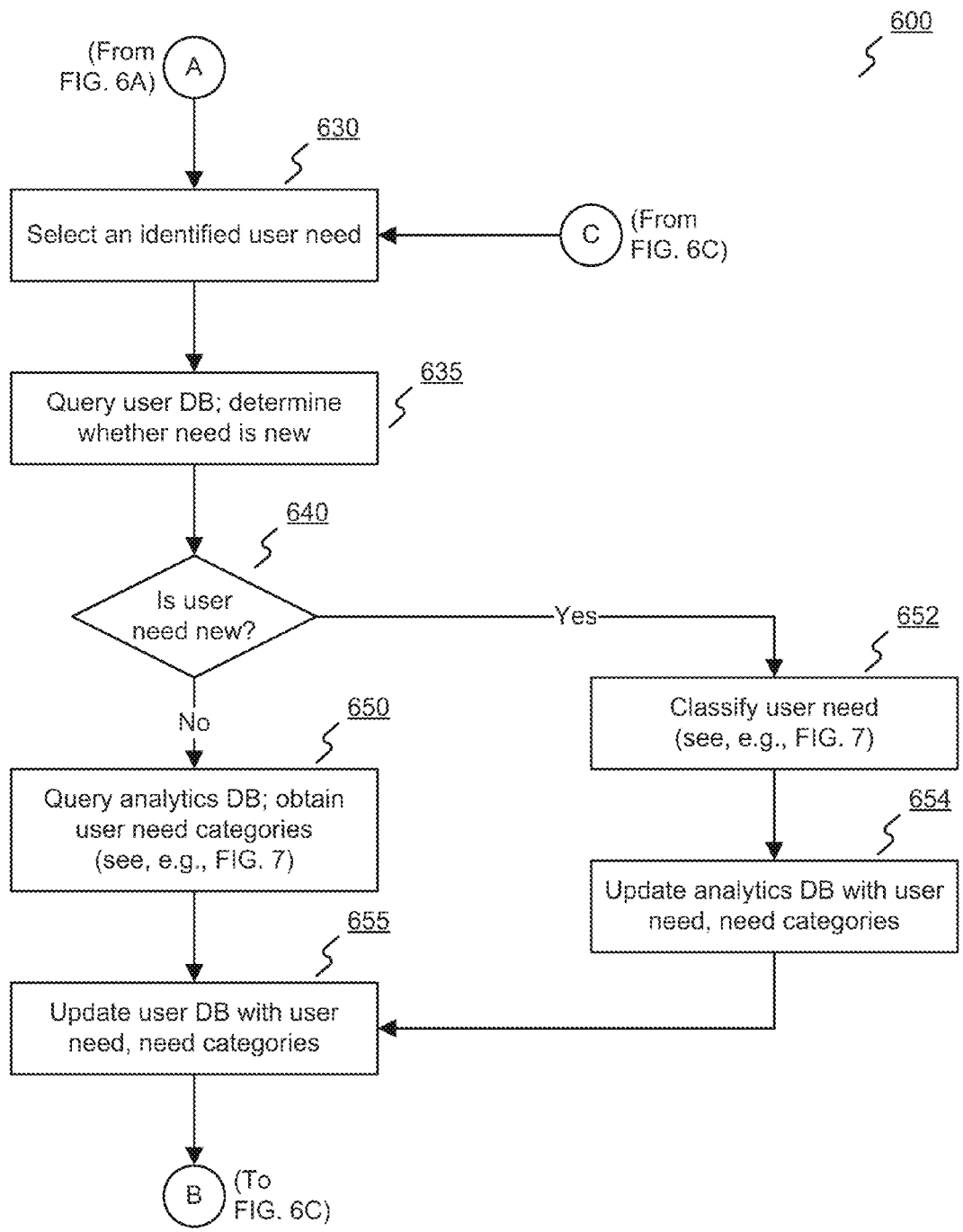
Figure 6C:
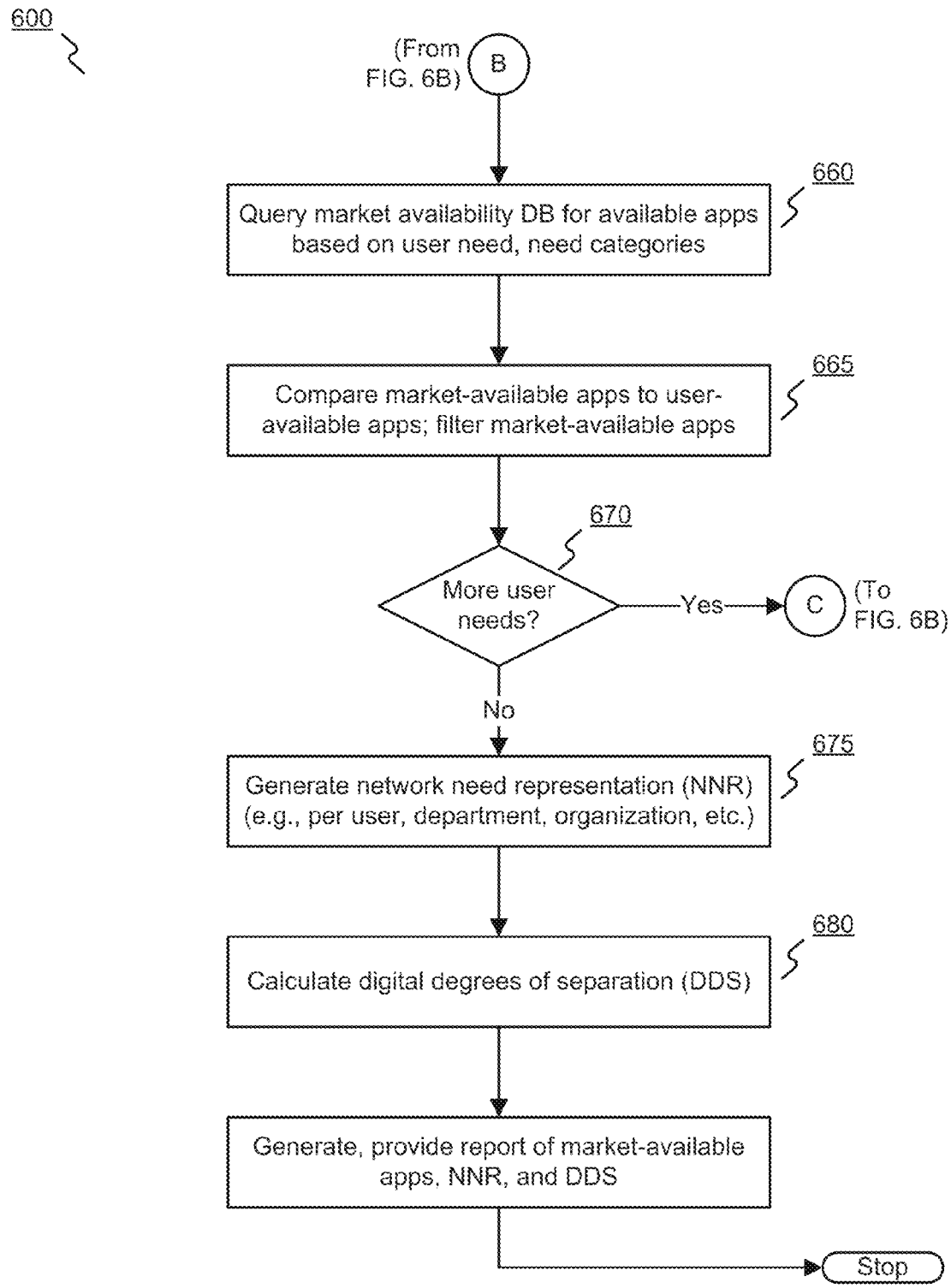

FIGS. 6A-C are flow diagrams illustrating an exemplary DDS determination method 600 in accordance with some embodiments of the present disclosure. With reference to FIG. 6A, at step 605, the DDS system 100 may obtain user credentials, and at step 610, query a user database 162 to determine user classification(s) for the user. At step 615, the DDS system 100 may query the user database 162 to determine a list of applications provided to the user or accessible to the user. At step 620, the DDS system 100 may interrogate the user device being used by the user to interact with the DDS system 100 to determine application installed on the user device. For example, the DDS system 100 may query an application registry (e.g., Microsoft Windows registry) to determine a list of installed applications. At step 625, the DDS system 100 may determine user needs based on the user classification(s), as well as from user form input or data captured from the user's interaction with a web application. When utilizing the user classification to determine the user needs, the DDS system 100 may query an analytics database 163 or user database 162 to determine what needs users in the same classification as the current user need to perform their respective roles.

With reference to FIG. 6B, at step 630, the DDS system 100 may select an identified user need, and at step 635, query a user database 162 or analytics database 163 to determine whether that need is new to the user or to the organization within which the user belongs. At 640, if the DDS system 100 determines that the need is new, the DDS system 100 may, at step 652, perform an artificial intelligence/fuzzy logic analysis to determine classification(s) for the new user need. At step 654, the DDS system 100 may update the analytics database 163 with the newly-identified need and the need categories to which it belongs. If, at step 640, the DDS system 100 determines that the identified need is not new to either the user or the organization, at step 650, the DDS system 100 may query the analytics database 163 to determine the user need categories corresponding to the identified need. At step 655, the DDS system 100 may update the user database 162 with the user need and user need categories identified for that need.

With reference to FIG. 6C, at step 660, the DDS system 100 may query market availability database 161 for available applications to satisfy the needs and need categories identified for the user. For example, the the DDS system 100 may use definitions for the identified need, and need categories, to query the market availability database 161 for related applications. At step 665, the DDS system 100 may compare the identified market-available applications to those the user already has installed on the user device or has access to otherwise. For example, the DDS system 100 may analyze such information as: date of last version update, version number, reviews, community ratings, feature sets, bug fixes, crash logs, etc., to determine whether the market-available applications constitute improvements such that they may be desired by the user in place of the applications to which the user has access, or which the user has installed on the user device. Accordingly, the DDS system 100 may filter the market-available applications to those that may be recommended to the user as improvements. In some embodiments, the DDS system 100 may provide recommendations via user interface 110 to the user for market-available applications that the user may choose to utilize instead of applications that are already available to the user. In some embodiments, a user may choose to install one of the recommended market-available applications based on the recommendation by the DDS system 100. In some embodiments, depending on security settings and permissions granted to the DDS system 100 to access the user device, the DDS system 100 may automatically initiate installation of one or more market-available applications recommended as improvement over the currently-accessible or installed applications.

At step 670, if there are further user needs to be processed, the DDS system 100 may return processing control to step 630. Otherwise, at step 675, the DDS system 100 may generate a network need representation (NNR) for the user, department, role, organization, etc. See FIGS. 7-8 for example NNRs. At step 680, the DDS system 100 may calculate a digital degrees of separation (DDS) measure, as explained further below with reference to FIG. 8. And at step 685, the DDS system 100 may generate and provide a report of market-available applications, the DDS measure, the NNR, etc. to the user or for storage in the user database 162 and/or analytics database 163.

Figure 7:
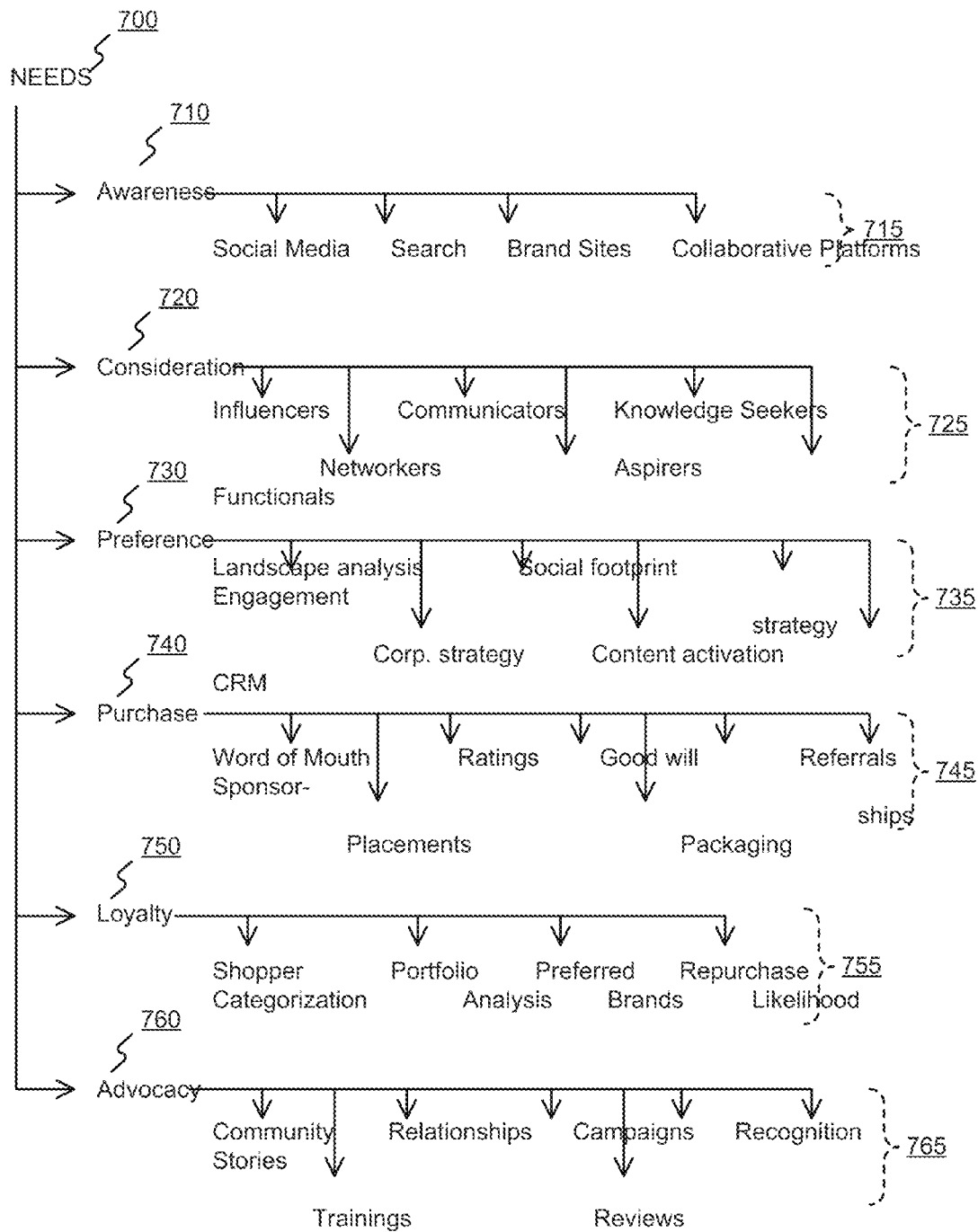
FIG. 7 is a block diagram illustrating an exemplary needs categorization hierarchy in accordance with some embodiments of the present disclosure.

Returning to FIGS. 2A-B, with specific reference now to FIG. 2B, if an identified digital need is new for the user or for the DDS system 100 itself (see FIG. 2A, step 235), at step 240, the DDS system 100 may categorize the user need into one or more need categories. FIG. 7 is a block diagram illustrating an exemplary needs categorization hierarchy in accordance with some embodiments of the present disclosure. Needs categorization hierarchy 700 may include a number of high-level needs categories to which digital applications either accessible by users or present in a market place may broadly be considered relevant, e.g., awareness 710, consideration 720, preference 730, purchase 740, loyalty 750, advocacy 760. With each high-level category, a number of sub-categories may be specified. While each sub-category may be pertinent to the high-level category under which it falls, the sub-categories may define distinct sub-sets different from other sub-categories within the same high-level category. For example, within the awareness 710 category, sub-categories 715 may be identified such as: social media, search, brand sites, and collaborative platforms. Within the consideration 720 category, sub-categories 725 may be identified such as: influencers, networkers, communicators, aspirers, knowledge seekers, and functionals. Within the preference 730 category, sub-categories 735 may be identified such as: landscape analysis, corporate strategy, social footprint, content activation, engagement strategy, and customer relationship management (CRM). Within the purchase 740 category, sub-categories 745 may be identified such as: word of mouth, placements, ratings, good will, packaging, referrals, and sponsorships. Within the loyalty 750 category, sub-categories 755 may be identified such as: shopper categorization, portfolio analysis, preferred brands, and repurchase likelihood. Within the advocacy 760 category, sub-categories 765 may be identified such as: community, trainings, relationships, campaigns, reviews, recognition, and stories. The two-level categorization, with categories and sub-categories, listed above is only exemplary and are not limiting of the present disclosure. It is contemplated that any categorization hierarchy, with any number of categorization levels within the hierarchy, may be chosen with a broad range of categories.

Returning to FIG. 2B, at step 245, the DDS system 100 may generate a digital satisfaction index. For example, the DDS system 100 may roll out a survey to users asking for information on their satisfaction levels after the users utilize the DDS system 100 to determine their digital needs and assess market availability of alternate applications to satisfy the users' needs. As an illustration only, the digital satisfaction index may have the following potential values: Highly Dissatisfied=0; Moderately Satisfied=50; Satisfied=70; or Extremely Satisfied=100. At step 250, the DDS system 100 may update analytics database 163 with the user need, need categorization, and digital satisfaction index information. At step 255, the DDS system 100 may determine a digital-degrees-of-freedom value for a user, group, role, department, organization, etc.

Figure 8:
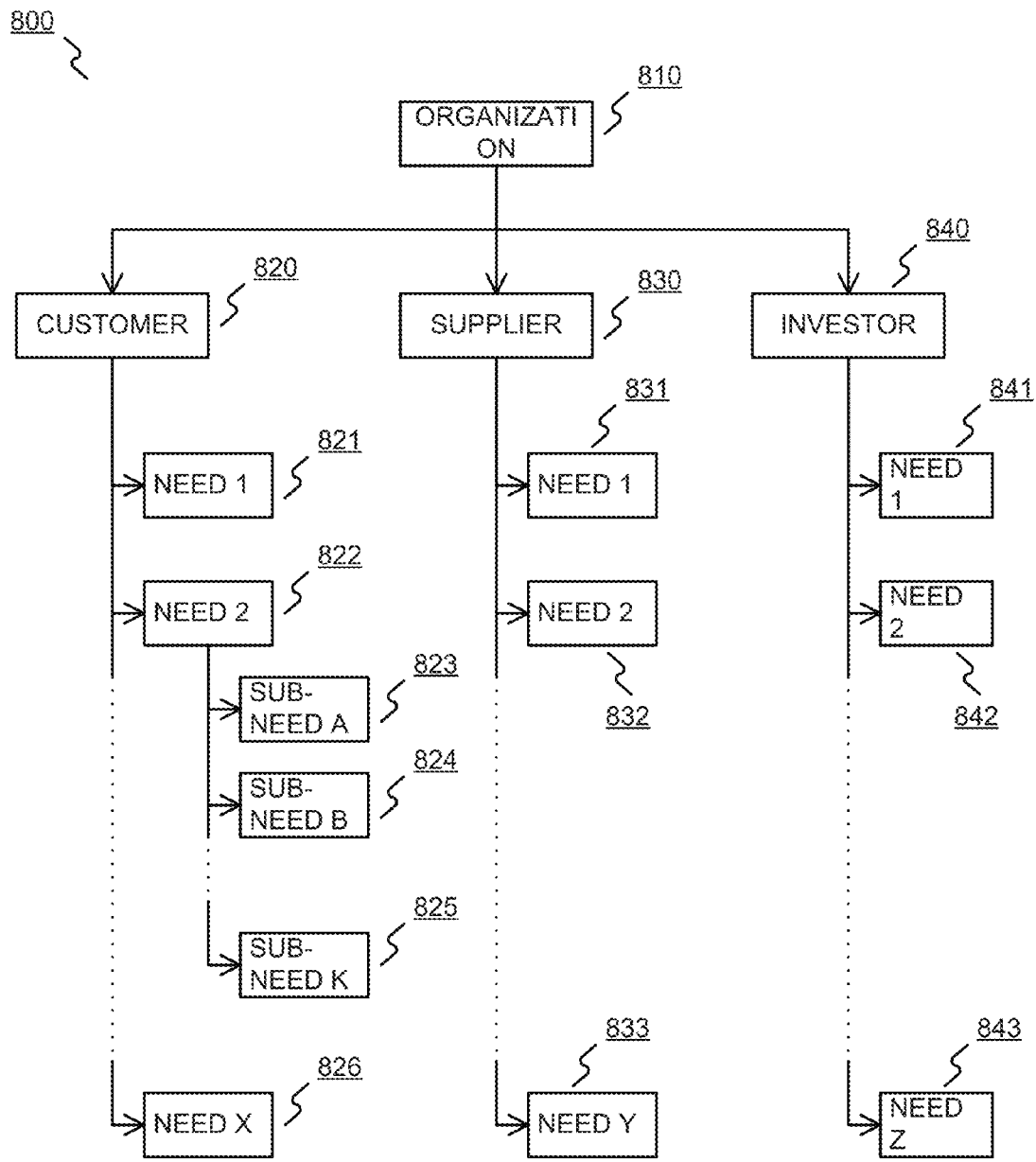
FIG. 8 is a block diagram illustrating an exemplary hierarchical networks needs representation in accordance with some embodiments of the present disclosure.

The digital degrees of separation metric may be derived, in some embodiments, from a representation of network needs arranged sequentially in a tree-like graph structure, and using mathematical matrix operations to calculate an average degree of separation between nodes in the graph. This graphical representation can be adapted to represent a wide range of network data. The nodes may be arranged such that they form a tree like structure as shown in FIG. 8. FIG. 8 is a block diagram illustrating an exemplary hierarchical network needs representation 800 in accordance with some embodiments of the present disclosure. In hierarchical network needs representation 800, an organization 810 may logically interact with various entities such as customers 820, suppliers 820, and investors 840. Each entity may its own hierarchy of needs, sub-needs, sub-sub-needs, and so on. For example, in FIG. 8, customer 820 is shown as having a need 1 (821), a need 2 (822), and so on until a need X (826). Further need 2 (822) of customer 820 may have a sub-need A (823), a sub-need B (824), and so on until a sub-need K (825), each of which must be fulfilled if need 2 (822) of customer 820 is to be fulfilled. Similarly, supplier 830 may have a need 1 (831), a need 2 (832), and so on until a need Y (833). And an investor 840 may have a need 1 (841), a need 2 (842), and so on until a need Z (843).

In this context, Let us say, we have a set of needs, for a user which will be denoted by $$N=\{N1,N2,N3,\ldots,N_x\}$$

In the example depicted in FIG. 8, N can be interpreted as customer 820, supplier 830, investor 840, or some other entity. Suppose node N1 has r needs that are associated with it. Further, let us say each of these r needs has another set of r needs hierarchically beneath it. This results in a total number of $r^2+r+1$ needs approximately.

As the process continues, we get $r^3$ number of needs in the third step and similarly $r^x$ needs in the $x^{th}$ step. FIG. 8 gives a graphical representation of this process. In this way, we can arrange any number of nodes for a given degree r. This is represented geometrically as follows:

$$r^1+r^1+r^2+r^3+\ldots+r^x=N_x$$

Here N is the total number of actors being considered. Now consider that each of these actors already has implemented or satisfied a digital need. We may denote the implementation of digital needs as s1, s2, s3 . . . $s_x$. The sub-needs of a need that the customer already has can be derived as follows:

$$s^0+s^1+s^2+s^3+\ldots+s^x=N_x$$

Thus, the difference in the needs that the customer has for the need $N_x$ can be derived as follows:

$$\underbrace{(r^0+r^1+r^2+r^3+\ldots+r^x)-(s^0+s^1+s^2+s^3+\ldots+s^x)=Nx}_{(Diff)}$$

The above equation may be represented as follows:

$$((1-r^x)/(1-r))-((1-s^x)/(1-s))=Nx_{(Diff)}$$

Here, $Nx_\theta$ represents an example degrees of separation measure, derived as follows:

$$Nx_\theta=(((1-s^x)/(1-s)))/((1-r^x)/(1-r)))*100$$

The summation of all separation of needs may give a total extent of separation across all user needs N1, N2, N3, . . . , $N_x$. Mathematically, $$2\pi \text{ radians}=360°$$

If we consider $(((1-s^x)/(1-s)))/((1-r^x)/(1-r)))*100$ as a radian, $N_\theta$ for one user may be represented as follows:

$$N_\theta = \left(\left(\sum_{i=1}^{x}(((1-s^x)/(1-s)))/((1-r^x)/(1-r))\right)*100/x\right)/2\pi\right)*$$

360 degrees

For each of the user, $N_\theta$ may be calculated in this way, to derive that user's digital degrees of separation.

Computer System

Figure 9:
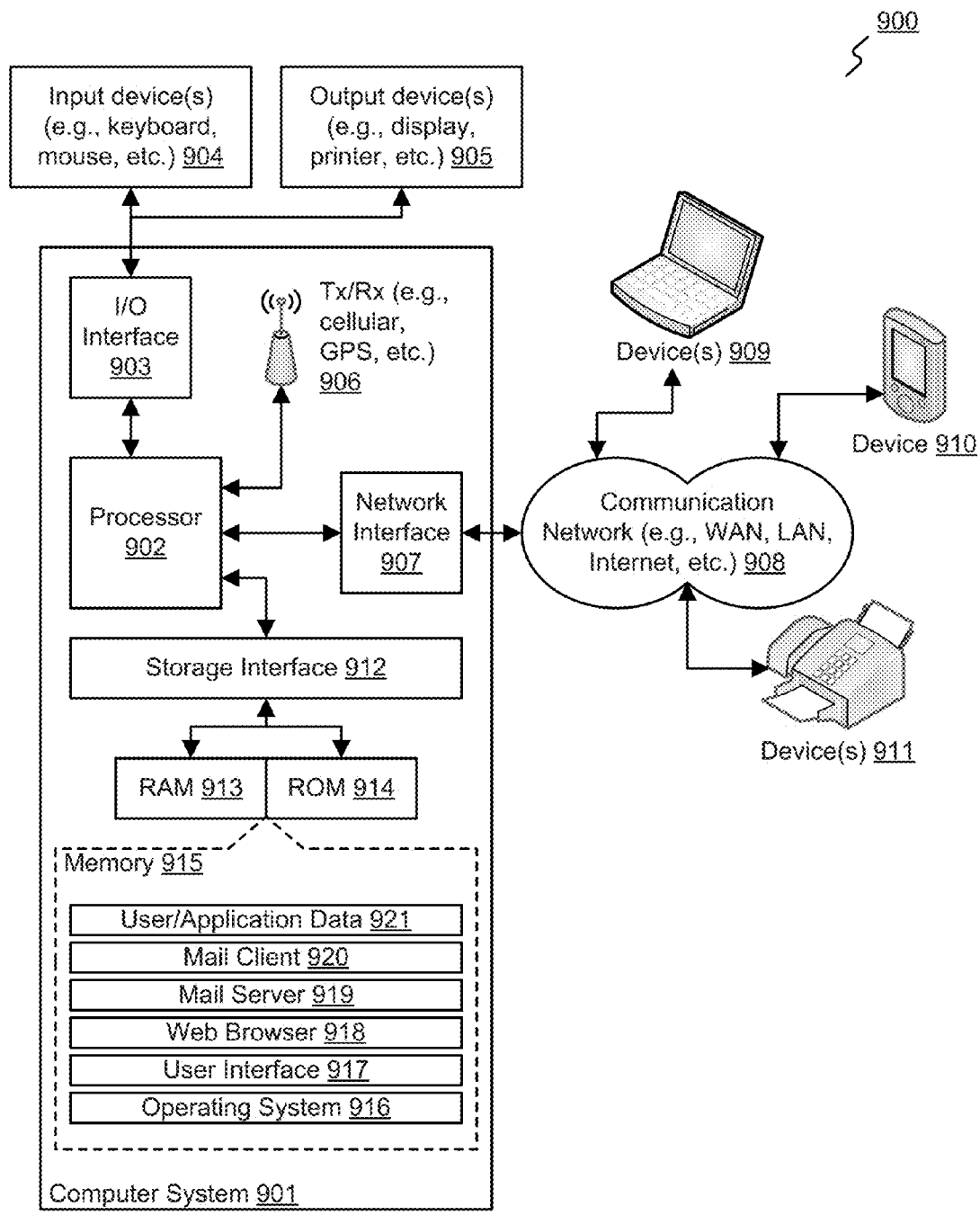
FIG. 9 is a block diagram of an exemplary computer system for implementing embodiments consistent with the present disclosure.

FIG. 9 is a block diagram of an exemplary computer system for implementing embodiments consistent with the present disclosure. Variations of computer system 901 may be used for implementing any of the devices discloses herein, including system 100 and/or any of its components. Computer system Error! Reference source not found.01 may comprise a central processing unit ("CPU" or "processor") 902. Processor 902 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The 902 may be implemented using mainframe, distributed processor, multi-core, parallel, grid, or other architectures. Some embodiments may utilize embedded technologies like application-specific integrated circuits (ASICs), digital signal processors (DSPs), Field Programmable bate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer 901 may communicate with devices 910, 911, and 912. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.) via a storage interface 912. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing any of the databases disclosed herein.

The memory devices may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 901 may implement a web browser 918 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 901 may implement a mail server 919 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc., as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for determining digital degrees of separation for digital program implementation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for facilitating access to a software application, comprising:
    a hardware processor, and
    a memory storing instructions executable by the processor for:
        obtaining, via an electronic interface, user credentials from a user;
        determining a user classification based on the user credentials;
        querying an analytics database that associates a set of user classifications with a hierarchy of user digital needs and user digital sub-needs;
        identifying a user digital need and one or more associated user digital sub-needs based on a query result from the analytics database;
        querying a market availability database for a list of market-available software application related to the user digital need;
        obtaining a user-accessible software application related to the user digital need;
        determining a digital degrees of separation that represents a measure of a difference between capabilities of the market-available software application and the user-accessible software application, the digital degrees of separation being determined based on a degree of fulfillment of the one or more user digital sub-needs by the market-available software application and the user-accessible software application; and
        providing access to the market-available software application based on the determined digital degrees of separation.

2. The system of claim 1, the memory further storing instructions for:
    generating a network need representation using the identified user digital need;
    wherein the digital degrees of separation measure is determined using the network need representation.

3. The system of claim 1, wherein obtaining the user-accessible software application comprises interrogating a user device to identify an installed application.

4. The system of claim 1, the memory further storing instructions for:
    providing a user interface;
    obtaining user input via the user interface; and
    obtaining a list of user-accessible software applications using the user input.

5. The system of claim 1, the memory further storing instructions for:
    identifying at least one category for the user digital need; and
    querying the market availability database for the market-available software application based on the at least one category for the user digital need.

6. The system of claim 1, the memory further storing instructions for:
    generating a recommendation for the market-available software application based on the digital degrees of separation.

7. The system of claim 6, the memory further storing instructions for:
    providing a recommendation to install the market-available software application on a user device.

8. The system of claim 1, the memory further storing instructions for: querying the analytics database using the identified user digital need; determining that the identified user digital need is new based on querying the analytics database; and updating the analytics database using the identified user digital need.

9. The system of claim 1, the memory further storing instructions for:
    capturing data from user interactions and web pages; and
    determining the degree of fulfillment of the one or more user digital sub-needs by the market-available software application based on the captured data.

10. The system of claim 9, the memory further storing instructions for:
    updating at least one of the analytics database and the market availability database based on the captured data.

11. A method for facilitating access to a software application, comprising:

obtaining, via an electronic interface, user credentials from a user;
determining a user classification based on the user credentials;
querying an analytics database that associates a set of user classifications with a hierarchy of user digital needs and user digital sub-needs;
identifying a user digital need and one or more associated user digital sub-needs based on a query result from the analytics database;
querying a market availability database for a market-available software application related to the user digital need;
obtaining a user-accessible software application related to the user digital need;
determining a digital degrees of separation that represents a measure of a difference between capabilities of the market-available software application and the user-accessible software application, the digital degrees of separation being determined based on a degree of fulfillment of the one or more user digital sub-needs by the market-available software application and the user-accessible software application; and
providing access to the market-available software application based on the determined digital degrees of separation.

12. The method of claim 11, further comprising:
generating a network need representation using the identified user digital need;
wherein the digital degrees of separation measure is determined using the network need representation.

13. The method of claim 11, wherein obtaining the user-accessible software application comprises interrogating a user device to identify an installed application.

14. The method of claim 11, further comprising:
providing a user interface;
obtaining user input via the user interface; and
obtaining a list of user-accessible software applications using the user input.

15. The method of claim 11, further comprising:
identifying at least one category for the user digital need; and
querying the market availability database for the market-available software application based on the at least one category for the user digital need.

16. The method of claim 11, further comprising:
generating a recommendation for one of the market-available software application based on the digital degrees of separation.

17. The method of claim 16, further comprising:
providing a recommendation to install the market-available software application on a user device.

18. The method of claim 11, further comprising: querying the analytics database using the identified user digital need; determining that the identified user digital need is new based on querying the analytics database; and updating the analytics database using the identified user digital need.

19. A non-transitory computer-readable medium storing a set of instructions that, when executed by a hardware processor, causes the hardware processor to perform a method for facilitating access to a software application, the method comprising:
obtaining, via an electronic interface, user credentials from a user;
determining a user classification based on the user credentials;
queuing an analytics database that associates a set of user classifications with a hierarchy of user digital needs and user digital sub-needs;
identifying a user digital need and one or more associated user digital sub-needs based on a query result from the analytics database;
querying a market availability database for a market-available software application related to the user digital need;
obtaining a user-accessible software application, related to the user digital need;
determining a digital degrees of separation that represents a measure of a difference between capabilities of the market-available software application and the user-accessible software application, the digital degrees of separation being determined based on a degree of fulfillment of the one or more user digital sub-needs by the market-available software application and the user-accessible software application; and
providing access to the market-available software application based on the determined digital degrees of separation.

20. The medium of claim 19, further storing instructions that causes the hardware processor to perform:
generating a network need representation using the identified user digital need;
wherein the digital degrees of separation measure is determined using the network need representation.

21. The medium of claim 19, wherein obtaining the list of user-accessible software application comprises interrogating a user device to identify an installed application.

22. The medium of claim 19, further storing instructions that causes the hardware processor to perform:
providing a user interlace;
obtaining user input via the user interlace; and
obtaining a list of user-accessible software applications using the user input.

23. The medium of claim 19, further storing instructions that causes the hardware processor to perform:
identifying at least one category for the user digital need; and
querying the market availability database for the market-available software application based on the at least one category for the user digital need.

24. The medium of claim 19, further storing instructions that causes the hardware processor to perform:
generating a recommendation for the market-available software application based on the digital degrees of separation.

25. The medium of claim 24, further storing instructions that causes the hardware processor to perform:
providing a recommendation to install the market-available software application on a user device.

26. The medium of claim 19, further storing instructions for: querying the analytics database using the identified user digital need; determining that the identified user digital need is new based on querying the analytics database; and updating the analytics database using the identified user digital need.

* * * * *

UNITED STATES PATENT AND TRADEMARK OFFICE
CERTIFICATE OF CORRECTION

PATENT NO. : 9,811,844 B2
APPLICATION NO. : 14/619005
DATED : November 7, 2017
INVENTOR(S) : Sreenivas Kunapuli et al.

It is certified that error appears in the above-identified patent and that said Letters Patent is hereby corrected as shown below:

In the Claims

Claim 1, Column 14, Lines 1-2, "querying a market availability database for a list of market-available software" should read --querying a market availability database for a market-available software--.

Claim 16, Column 15, Line 47, "generating a recommendation for one of the" should read --generating a recommendation for the--.

Claim 19, Column 16, Line 3, "queuing" should read --querying--.

Claim 21, Column 16, Lines 32-33, "wherein obtaining the list of user-accessible software application" should read --wherein obtaining the user-accessible software application--.

Claim 22, Column 16, Line 37, "interlace" should read --interface--.

Claim 22, Column 16, Line 38, "interlace" should read --interface--.

Claim 26, Column 16, Line 59, "for:" should read --that causes the hardware processor to perform:--.

Signed and Sealed this
Sixth Day of February, 2018

Joseph Matal
*Performing the Functions and Duties of the
Under Secretary of Commerce for Intellectual Property and
Director of the United States Patent and Trademark Office*